United States Patent [19]
Litz et al.

[11] Patent Number: 5,108,662
[45] Date of Patent: Apr. 28, 1992

[54] GAS-LIQUID MIXING PROCESS AND APPARATUS

[75] Inventors: Lawrence M. Litz, Pleasantville; Thomas J. Bergman, Jr., North Tarrytown; Mitchell Adis, North White Plains, all of N.Y.

[73] Assignee: Union Carbide Industrial Gases Technology Corporation, Danbury, Conn.

[21] Appl. No.: 694,070

[22] Filed: May 1, 1991

[51] Int. Cl.$^5$ .................................... B01F 3/04
[52] U.S. Cl. .......................... 261/16; 261/91; 261/93; 261/36.1
[58] Field of Search .............. 261/16, 91, 93, 36.1

[56] References Cited
U.S. PATENT DOCUMENTS

| | | | |
|---|---|---|---|
| Re. 32,562 | 12/1987 | Litz | 261/91 |
| 2,964,382 | 12/1960 | Hall, Jr. | 261/93 |
| 3,615,079 | 10/1971 | De Lara et al. | 261/16 |
| 4,235,719 | 11/1980 | Pearson | 261/36.1 |
| 4,290,885 | 9/1981 | Kwak | 261/36.1 |
| 4,328,175 | 5/1982 | Roeckel et al. | 261/91 |
| 4,639,340 | 1/1987 | Garrett | 261/36.1 |
| 4,680,119 | 7/1987 | Franklin, Jr. | 261/93 |
| 4,699,740 | 10/1987 | Bollenrath | 261/93 |
| 4,933,115 | 6/1990 | Krippl et al. | 261/36.1 |

*Primary Examiner*—Tim Miles
*Attorney, Agent, or Firm*—Alvin H. Fritschler

[57] ABSTRACT

A high efficiency gas dissolution system is used to dissolve gas in a portion of a body of liquid, improving gas utilization and reducing associated energy requirements. A portion of the body of liquid is recirculated through a mechanical, in-line gas dissolution device wherein a secondary feed gas is dissolved in the liquid.

17 Claims, 4 Drawing Sheets

GAS-LIQUID MIXING PROCESS AND APPARATUS

BACKGROUND OF THE INVENTION

1. Field of the Invention

The invention relates to the mixing of gases and liquids. More particularly, it relates to the dissolving and/or reacting of oxygen and other gases in liquids.

2. Description of the Prior Art

A wide variety of techniques and systems are known in the art for achieving the mixing of gases and liquids. One commonly used system comprises a stirred-tank reactor (STR) system in which, e.g., air is sparged into a reactor equipment with a mechanical stirring device. The impellers of the stirring device serve to mix the contents of the reactor so as to cause, for example, oxygen from air to dissolve in a body of liquid in the reactor vessel. Such STR systems can be used for a variety of gas-liquid mixing operations, e.g., large aerobic fermentations, such as are used to produce yeast or certain pharmaceuticals, or large leach tank operations, such as are used to dissolve gold from ore with an aqueous solution of sodium cyanide. In many such operations, however, it is desirable to add more oxygen or other gas than the conventional STR system is capable of efficiently dissolving or otherwise processing. As a result, other gas-liquid mixing processes and apparatus are needed to satisfactorily meet the practical requirements of various commercial operations. In many cases, however, it is desirable not to change the primary mixer system, but to add a secondary dissolution-process vessel to the primary mixer system.

A gas-liquid mixing system which is often used to augment the gas dissolution capabilities of a primary dissolver such as the STR is the so-called Side-Stream Pumping (SSP) pipeline contactor system. In the operation of the SSP system, liquid is typically recirculated from a primary supply source, such as the STR, through a recirculation pipe for gas addition at an elevated flow pressure and at a flow velocity sufficiently high to provide turbulent mixing conditions within the liquid. Such turbulent flow conditions are typically sufficient to disperse gas added to the liquid and, together with the use of elevated flow pressures, to enhance such dispersion for gas dissolution purposes, and, where applicable, enhanced reaction of gas and liquid or the constituents thereof. The liquid from the SSP system, containing high concentrations of said added gas, is then returned to the primary source to supply the desired enrichment thereof. While SSP systems are effective for gas-liquid mixing purposes, the pumping energy requirements of such systems are generally quite high, and this factor creates a major drawback to the use of such systems, particularly when substantial quantities of gas are to be dissolved in a liquid. The gas utilization of the SSP system, in addition, is often not as great as desired in practical commercial operations.

It will be appreciated, therefore, that a genuine desire exists in the art for a alternative means of dissolving large quantities of gas in, and/or reacting large quantities of gas with, liquids. Desirably such means would achieve the dissolving of gas in liquid with the expenditure of substantially less energy than is consumed in the use of SSP dissolver systems. In addition, such means would desirably enable high gas utilization efficiencies to be achieved as compared to such SSP systems. In particular, there is a desire in the art for such improved processing in applications where it is desired to efficiently disperse a separate gas, such as oxygen, in a liquid into which another gas, such as air, is being introduced.

It is an object of the invention, thereof, to provide an improved process and apparatus for the mixing of gases and liquids.

It is another object of the invention to provide an improved process and apparatus for the dissolving of gases in liquids at desirably low pumping energy requirements.

It is a further object of the invention to provide an improved process and apparatus for the dissolving of large quantities of gases in liquids at high levels of gas utilization combined with low pumping energy requirements.

It is a further object of the invention to provide an improved process and apparatus for the dispersion of a second gas into a body of liquid into which a first gas is being dispersed.

With these and other objects in mind, the invention is hereinafter described in detail, the novel features thereof being particularly pointed out in the appended claims.

SUMMARY OF THE INVENTION

A high energy and gas utilization efficiency, in-line gas dissolution device is used in place of the pipeline contactor of an SSP system. As a result, the energy required per unit quantity of gas dissolved and/or reacted with liquid is substantially reduced and high gas utilization efficiencies are obtained.

BRIEF DESCRIPTION OF THE DRAWINGS

The invention is hereinafter further described with reference to the accompanying drawings in which.

DETAILED DESCRIPTION OF THE INVENTION

The objects of the invention are accomplished by the substitution of a high efficiency, in-line gas dissolution device for the pipeline contactor of an SSP system. As a result, the energy required per unit quantity of gas dissolved and/or reacted with liquid is substantially reduced, and desirably high gas utilization efficiencies are obtained as compared to those of conventional SSP dissolver systems.

An illustrative example of the high efficiency gas dissolution device that can be used in the practice of the invention is the Advanced Gas Reactor (AGR) device disclosed, for example, in the Roeckel et al. U.S. Pat. No. 4,328,175, and in the Litz reissue U.S. Pat. No. Re 32,562. It has been found that such high efficiency gas dissolution devices are highly effective when employed as in-line gas dissolvers, in the practice of the invention, to substitute for the pipeline contactor employed in the side stream of said SSP systems. Such use of the high efficiency, in-line gas dissolution devices involves the processing therein of a portion of relatively large body of liquid for the dissolution of gas therein and the recirculation of such portion of liquid back into the remaining portion of said large body of liquid being processed.

Figure 1:
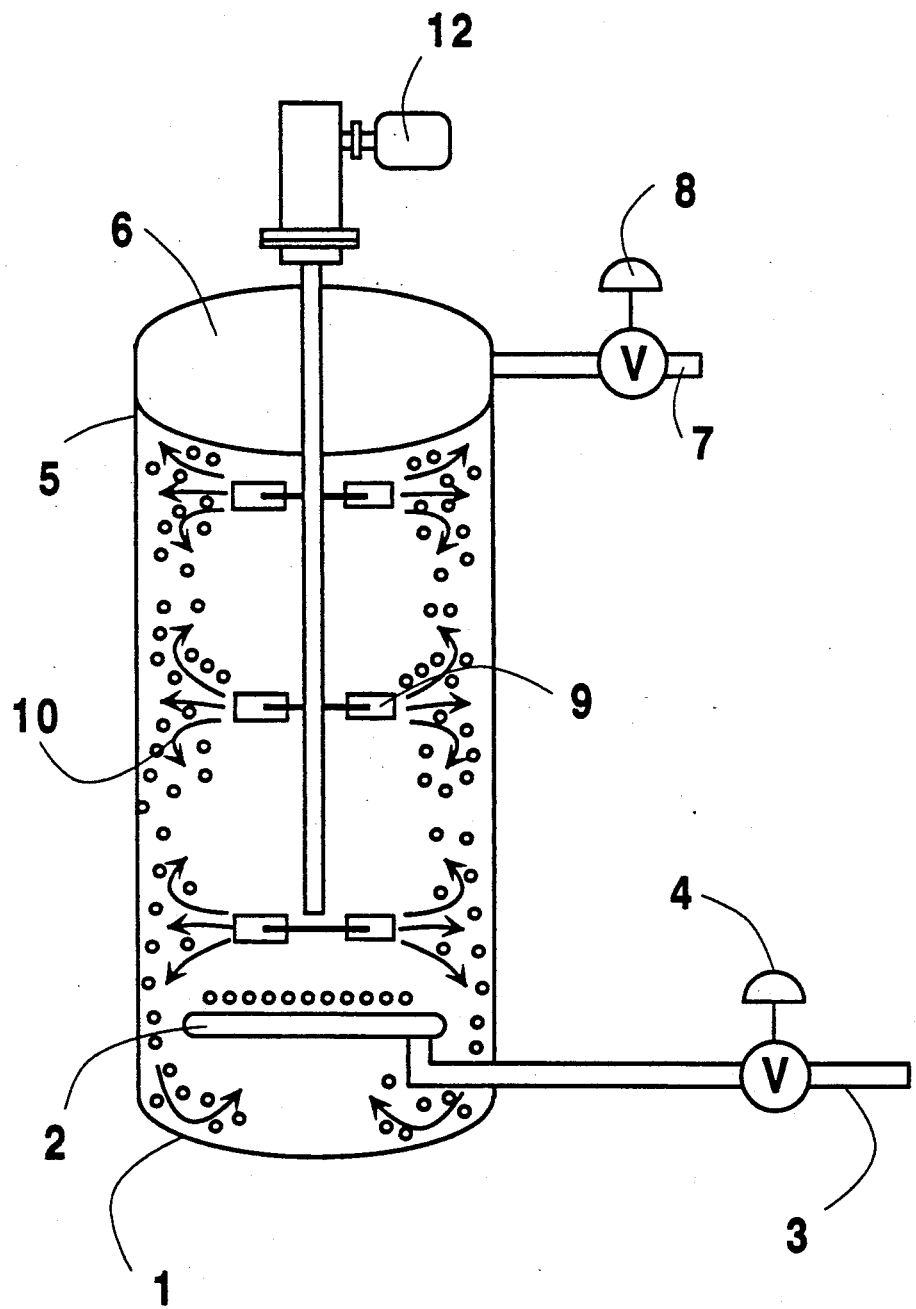
FIG. 1 is a side elevational view of a conventional STR system for the mixing of gas and liquid.

FIG. 1 illustrates a conventional STR system in which a large reactor vessel 1 has sparger means 2 positioned in the lower portion thereof, with line 3 containing control valve 4 being provided to enable air or other gas from an outside source to be passed to said sparger means 2. A gas-liquid interface 5, with an overhead gas space 6, are provided for in the operation of the STR system, with gas withdrawal line 7, having control valve 8 therein, being provided in order to vent gas from said vessel 1. Impeller means 9 are positioned in reactor vessel 1 so as to produce circulating liquid flow patterns, represented generally by the numeral 10, within the vessel to facilitate the forming of a uniform dispersion of the gas bubbles formed in gas sparger means 2 within the body of liquid in the vessel, thus facilitating the dissolution of the gas in the liquid. Impeller means 9 have drive shaft 11 that extends upward from vessel 1 for connection to suitable drive means 12.

Figure 2:
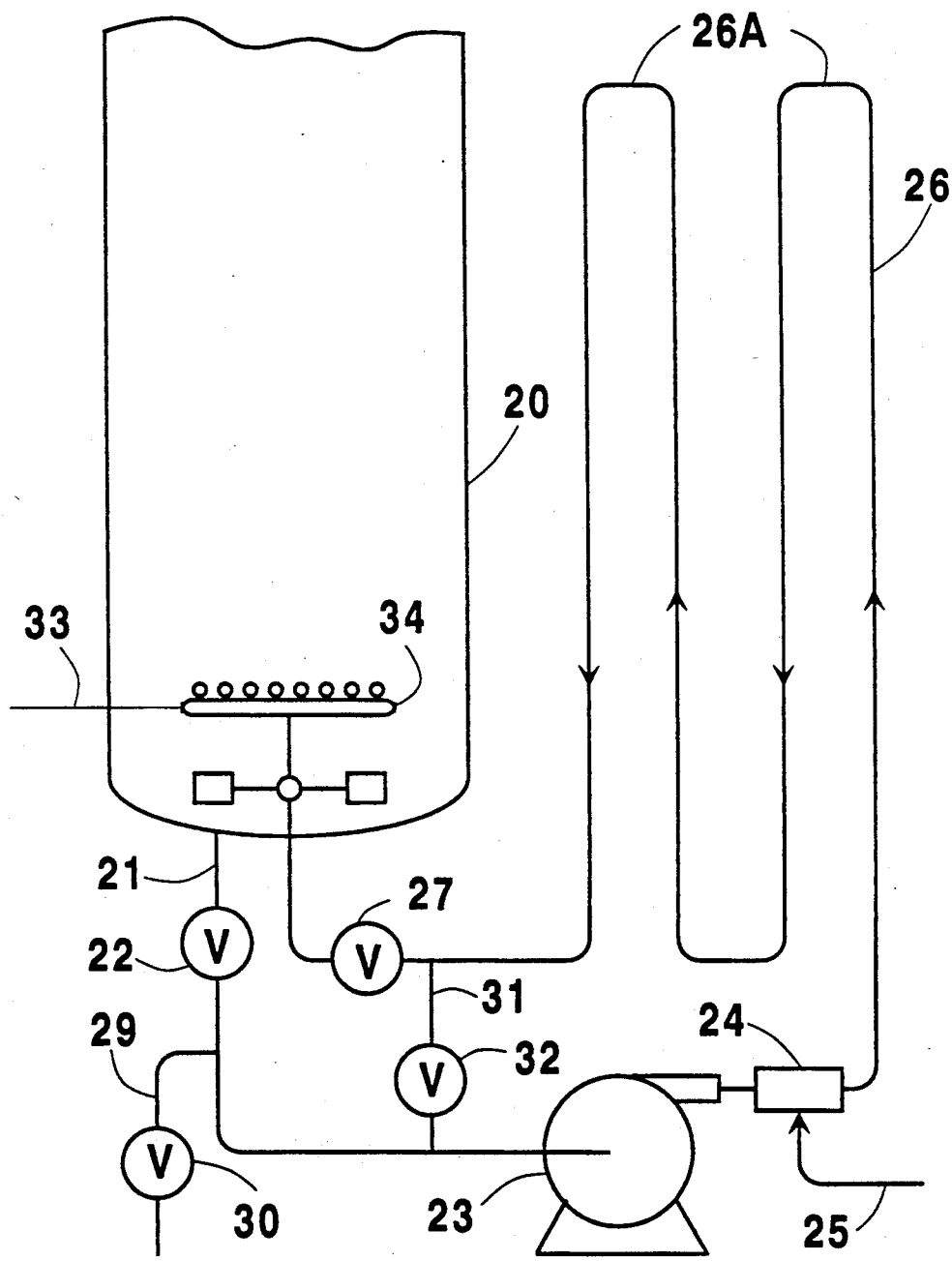
FIG. 2 is a flow diagram of a conventional SSP system for mixing gas and liquid.

In order to enable more gas to be dissolved into the liquid than is possible using the STR system of FIG. 1, the SSP system of FIG. 2 provides for a pipeline contactor for gas-liquid mixing outside the processing reactor or vessel. In the FIG. 2 system, vessel 20 has line 21 containing control valve 22 extending from the bottom thereof to pump 23 adapted to pump liquid from vessel 20 to gas sparger 24, to which a gas such as oxygen is passed through line 25. The gas-liquid mixture from gas sparger 24 is passed through a relatively long flow line, or pipeline contactor 25, preferably containing one or more return bends 26, for uniform dispersion of gas bubbles formed upon passage of gas into liquid from vessel 20 in gas sparger 24, and for the dissolution of said gas in the liquid. From pipeline contactor 25, desirably containing control valve 27, the gas-liquid mixture is passed into the bottom of vessel 20 for injection into the body of liquid contained therein through injectors 28. Line 29 containing control valve 30 is desirably provided to withdraw a portion of the gas-liquid mixture from the bottom of vessel 20 for sampling purposes, and similarly, line 31 with control valve 32 can be provided to withdraw a portion of the gas-liquid mixture from pipeline contactor 25. Primary gas, such as air, is commonly introduced into vessel 20 through line 33 and sparger 34.

The conventional pressurized SSP system Pipeline contactor approach enables more secondary gas, such as oxygen, to be dissolved than can be efficiently dissolved employing an STR system using a primary gas such as air. As seen from the above, the primary gas is added by direct injection into the body of liquid in vessel 20, while the secondary gas is fed into the portion of the body of liquid from vessel 20 passing through gas sparger 24 and conventional pressurized SSP system pipeline contactor 25, and recirculating the resultant liquid enriched with the dissolved secondary gas back into vessel 20. With a typically designed SSP system, a pump having about a 115 horsepower motor would be required to dissolve 100 pounds per hour of oxygen in the SSP system. The nominal oxygen utilization of such a gas-liquid mixing operation would typically be about 75 percent, so that about 133 pounds of oxygen would need to be passed through SSP system pipeline contactor 25 for each 100 pounds of oxygen dissolved and utilized.

Figure 3:
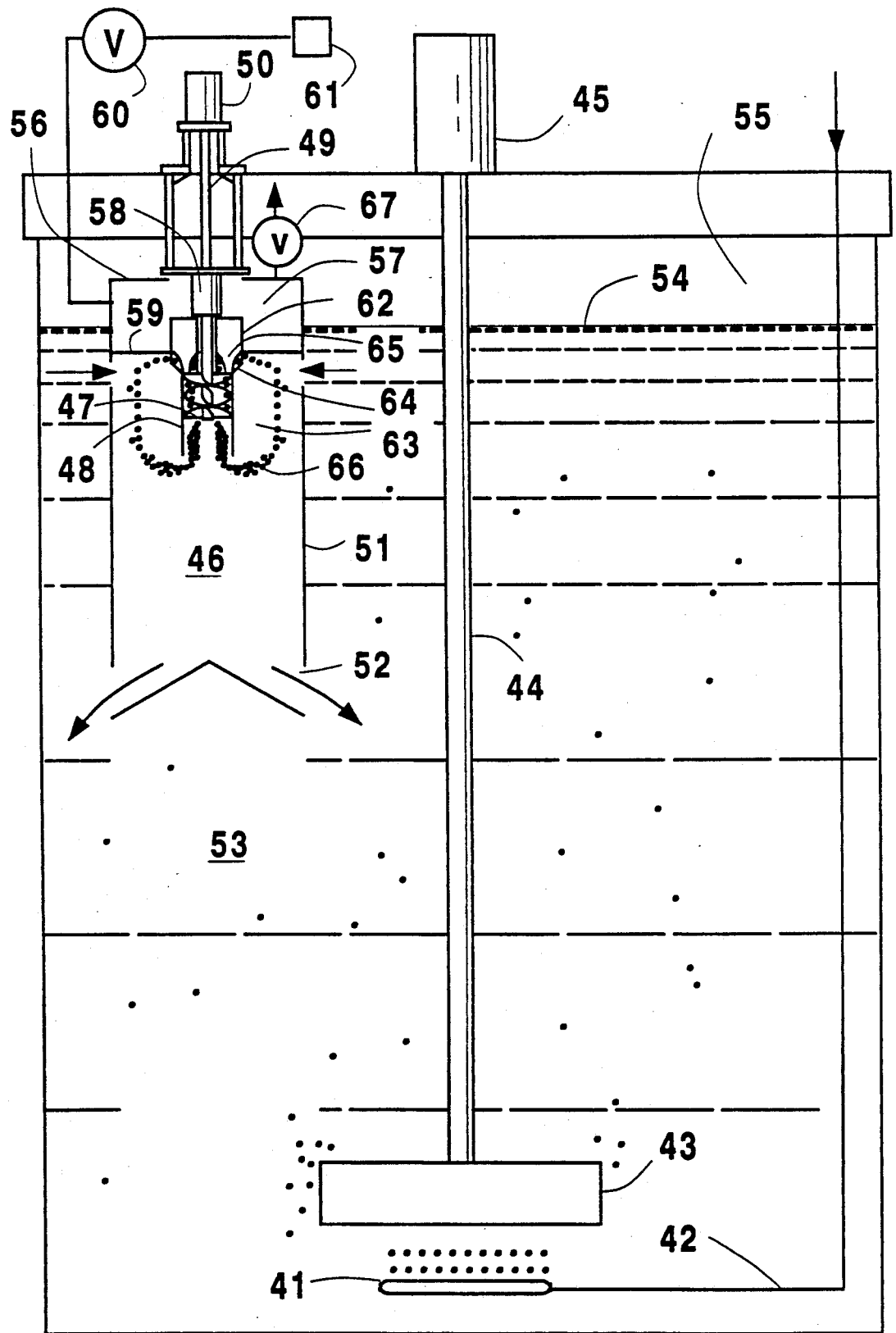
FIG. 3 is a side elevational view of a particular embodiment of the invention.

In the practice of the AGR embodiments of the invention, on the other hand, oxygen utilization would be essentially 100%, and the power required to dissolve 100 pounds of oxygen would be only about 10 to 20 horsepower. In one AGR embodiment of the invention as shown in FIG. 3, a comparatively small AGR unit is positioned inside a large reaction vessel and serves to significantly reduce the overall energy requirements and to significantly increase the utilization of oxygen or other gas as compared to the energy requirements and gas utilization typically obtained using the SSP system. In said FIG. 3 embodiment, large reaction vessel 40 has gas sparger 41 positioned near the bottom thereof, with line 42 being provided to pass gas to said sparger. Impeller means 43 is positioned in vessel 40 above gas sparger 41 so as to facilitate the distribution of gas bubbles from said sparger throughout vessel 40. Drive shaft 44 connected to overhead drive means 45 is used to rotate said impeller means 43. The small AGR unit, represented generally by the numeral 46, comprises high shear, axial flow, down-pumping, impeller means 47 illustrated as a double helical impeller, positioned inside a hollow draft tube 48. Impeller means 47 is rotated by drive shaft 49 connected to suitable motor means 50. Draft tube 48 and impeller means 47 are positioned within outer shell 51 that extends downward below draft tube 48 and has outlet passages 52 at the lower end for the passage of the dissolved oxygen rich liquid formed by AGR unit 46 into the body of liquid 53 present in vessel 40. Body of liquid 53 typically fills vessel 40 to the upper portion thereof, with gas-liquid interface 54 separating said liquid from overhead gas space 55 that provides desirable space for an increase in the volume of liquid in vessel 40. Outer shell 51 includes a roof portion 56 separating said overhead gas space 55 from the overhead gas space 57 within outer shell 51. Drive shaft seal means 58 are provided to allow slight pressurization of gas space 57 above the gas-liquid interface 59. Oxygen or other gas is passed to gas space 57 by a pressure regulator 60, or other such means from oxygen or other gas supply system 61, as needed to maintain a set pressure in said gas space 57 as some portion of the oxygen or other gas from the gas space is dissolved and consumed. Suitable baffles 62 are commonly positioned at the upper end of draft tube 48 to facilitate the flow of liquid into said draft tube 48 and to promote the formation of gas ingesting vortices 65. Draft tube 48 is also desirably provided with a conical portion 63 at the upper end thereof to further facilitate the flow of liquid into the top of said tube for passage downward therein in the influence of impeller means 47.

In the operation of the FIG. 3 embodiment in which AGR unit 46 is employed as an in-line mixer within vessel 40, the operation of impeller means 47 creates a recirculating flow pattern within outer shell 51 of AGR unit 46, such that liquid passes downward inside draft tube 48 and upward in the annular space 63 between said draft tube and walls of outer shell 51. Such recirculation flow pattern is such as to develop vortices 65 and to draw gas from overhead gas space 57 into the liquid flowing downward within draft tube 48 by gas ingestion at the operating liquid level providing gas-liquid interface 59 within AGR unit 46.

As the oxygen or other gas rich solution and associated gas bubbles 65 pass from the bottom of draft tube 48, their downward flow velocity is reduced to below the buoyancy induced rise velocity of the bubbles by virtue of the larger cross-section of outer shell 51 of AGR unit 46. As a result, gas bubbles will rise upward into said annular space 63 between draft tube 48 and outer shell 51. Some of these bubbles will be carried back into draft tube 48 by the liquid flowing back into the impeller zone, while the remainder will enter gas space 57 and ultimately be reingested, as a result of vortices 65, back into the liquid passing downward within draft tube 48. Gas vent 67 is used to vent gases from overhead gas space 57 as desired. In the practice of this embodiment of the invention, the oxygen or other gas utilization can approach 100%. Thus, about 33 pounds of oxygen can be saved in the practice thereof as compared to a corresponding conventional SSP system for the dissolution of 100 pounds of oxygen per hour.

The downward momentum of the oxygen or other gas-rich liquid stream from which bubbles have escaped will carry this liquid stream to the bottom of AGR outer shell 51 and out through outlet passages 52 into the main body of liquid 53 in vessel 40. Fresh, low oxygen or other gas content slurry will flow from the outside to the inside of AGR outer shell 51 through openings 66, preferably in the upper portion thereof as shown, to replace the volume of the liquid stream discharged from the bottom of outer shell 51. Because of the highly efficient gas dissolution capabilities of the AGR unit, and because the high shear helical impeller, preferably employed as illustrated, is a very energy efficient, high volume pumping device, and because the system of the invention is operated at essentially atmospheric pressure, only about 10 to 20 horsepower is required to dissolve 100 pounds of oxygen per hour as compared to about 115 horsepower for the SSP system.

The FIG. 3 embodiment of the invention illustrates the use of an AGR unit as a high efficiency, in-line gas dissolver employed to enhance the dissolution of gas into a portion of a body of liquid in a gas-liquid mixing vessel and to reduce the energy requirements thereof. The in-line AGR unit will be seen to substitute for the pipeline contactor portion of a conventional SSP system, except that the side stream of a desired gas-liquid mixture processed in the AGR unit is contained within the mixing vessel itself, i.e. within outer shell 51 of AGR unit 46. The high shear mixing action of the AGR unit serves to break up larger bubbles of gas into smaller gas bubbles, thereby enhancing the dissolution of gas in the portion of liquid passing through the AGR unit and then discharged into the main body of liquid in the mixing vessel.

Figure 4:
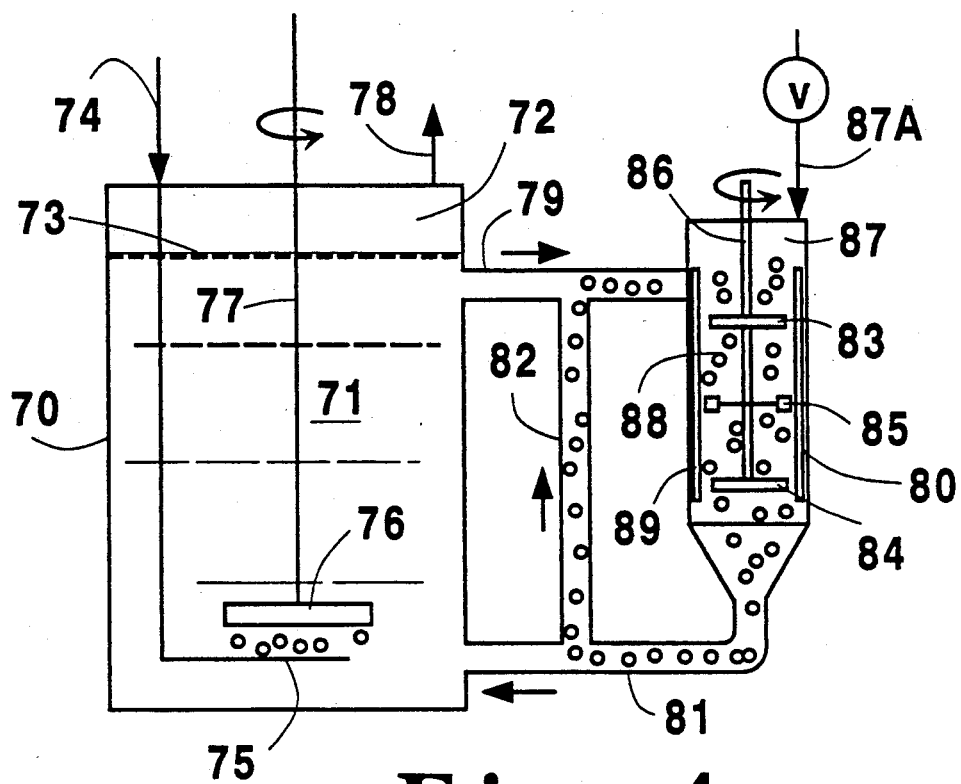
FIG. 4 is a side elevational view of an embodiment of the invention employing a side-stream mixer unit.

FIG. 4 illustrates another embodiment of the invention in which a relatively high efficiency gas dissolver is employed in a side stream removed from the mixing vessel to achieve the break up of larger gas bubbles into smaller bubbles for enhanced dissolution in the portion of liquid that is passed from the mixing vessel through said side stream and the in-line gas dissolver therein and is then recirculated to the mixing vessel. An illustrative example of the use of the FIG. 4 embodiment relates to the supply of additional dissolved oxygen to an enclosed fermentation system or other such liquid reservoir being supplied with air. While an AGR unit, as is described with reference to the FIG. 3 embodiment, is generally the most efficient gas dissolver device for use in this application, the FIG. 4 embodiment is described with reference to the use of a somewhat less efficient gas dissolver that can, nevertheless, also be used in the practice of the invention to reduce the energy requirements and to significantly increase the oxygen or other gas utilization capability of a gas-liquid mixing operation. Thus, in the FIG. 4 embodiment, a downward pumping, axial-flow impeller means is used, together with a Rushton turbine, radial-flow high shear impeller, to create in-line high shear conditions to achieve the break up of large gas particles into small bubbles to enhance the gas dissolution action, and thereby to enhance the gas utilization efficiency of the overall system. In this embodiment, fermenter vessel 70 is shown with a body of liquid 71 and an overhead gas space 72 therein, thereby forming gas-liquid interface 73. Air injection line 74 is used to pass feed air to sparger means 75 positioned in the lower portion of vessel 70. Paddle agitation means 76 is positioned over sparger means 75 and is driven by drive shaft 77 and drive motor means (not shown). Upon rotation of said paddle agitation means, the gas bubbles formed upon injection of gas from sparger means 75 into body of liquid 71 are dispersed into the liquid and passed with said liquid through a recirculating flow pattern within vessel 70 for dissolution of the gas in the liquid. Vent means 78 are provided to enable undissolved gas to be removed from the system. The enhanced gas dissolution and reduced energy requirements are achieved through the side stream, in-line application of said relatively high efficiency, high shear gas dissolver to a portion of the liquid recirculated from vessel 70.

As illustrated in FIG. 4, liquid passes from the upper portion of vessel 70 below gas-liquid interface 73 into essentially horizontal side stream inlet conduit 79 for passage into the upper portion of gas dissolver 80 and discharge from the bottom thereof into essentially horizontal discharge conduit 81 for recirculation back into the lower portion of vessel 70. Vertical connecting conduit 82 provides fluid communication between conduits 79 and 81. The diameter of discharge conduit 81 is desirably such that the flow velocity of the gas-liquid mixture passing there through is sufficiently low, e.g. nominally below about 5 feet/second, so that, in said horizontal conduit 81, the gas bubbles of said mixture will rise to the top of the conduit and, at the intersection with vertical connecting conduit 82, essentially all of the gas bubbles will rise up into said conduit, along with a small portion of the highly oxygenated liquid phase. By this means, the oxygen or other gas rich gas bubbles not dissolved initially in dissolver 80 can be returned to the high efficiency dissolver. Such fluid then passes into conduit 79 for recycle to gas dissolver 80. The major portion of the liquid phase, highly oxygenated by dissolved oxygen, flows back into the bottom portion of vessel 70. To maintain the hydrostatic pressure balance in the system, an equivalent volume of liquid will flow from vessel 70, through horizontal inlet conduit 79, back into gas dissolver 80, where additional quantities of oxygen will be dissolved therein.

Gas dissolver 80 as shown in FIG. 4 contains two axial flow impellers 83 and 84, with a Rushton turbine 85 positioned between them on common drive shaft 86, which is connected to an appropriate drive system (not shown). Upper impeller 83 is advantageously positioned at a depth below the liquid surface in gas dissolver 80 such that said impeller generates a vortex to draw air or preferably oxygen from overhead gas space 87 downward into the descending flow of liquid 88 within gas dissolver 80. Gas injection means 87A are desirably provided so that a second gas, such as oxygen, can be introduced into overhead gas space 87 for enhanced dispersion in the liquid passing through gas dissolver 80. As the gas-liquid mixture is passed downward into the flow pattern of Rushton turbine 85, gas bubbles in the mixture are substantially broken up, by the shear action of the turbine, into much finer sized bubbles, which enhances the dissolution of the gas in the liquid. Baffles 89 are preferably provided along or near the wall of gas dissolver 80 so as to impede the rotation of the liquid around the periphery of the wall of said gas dissolver 80, thereby improving the downward pumping and shearing action of the impellers. Lower axial-flow impeller 84 serves to impart additional downward momentum to the gas-liquid mixture, thereby pumping this mixture containing, for example, a highly oxygenated solution, out of gas dissolver 80 into discharge conduit 81.

Those skilled in the art will appreciate that other high efficiency gas dissolvers can be used in the practice of the invention besides those employed in the embodiments of FIGS. 3 and 4 as described above.

To further demonstrate the benefits of the invention, gas-liquid mixing operations were carried out in a system similar to that of the FIG. 4 embodiment, except that an AGR unit was employed as the high efficiency, in-line gas dissolver device in side stream gas dissolver 80. The elements of the FIG. 5 embodiment are numbered as for the FIG. 4 embodiment, except that double helical impeller 90 is positioned as said in-line AGR unit in place of axial-flow impellers 83 and 84, and Rushton turbine 85 of the FIG. 4 embodiment. Baffles 89 of the FIG. 4 embodiment need not be employed in the FIG. 5 embodiment, but suitable baffle means 91 may be positioned so as to facilitate the flow of liquid downward into said gas dissolver 80 containing AGR unit 90 therein and to facilitate formation of gas ingesting vortices. Said AGR unit is desirably positioned below the liquid surface in gas dissolver 80 such that said AGR unit generates vortices to draw oxygen or other gas from overhead gas space 87 downward into the descending flow of liquid 88 within gas dissolver 80.

Figure 5:
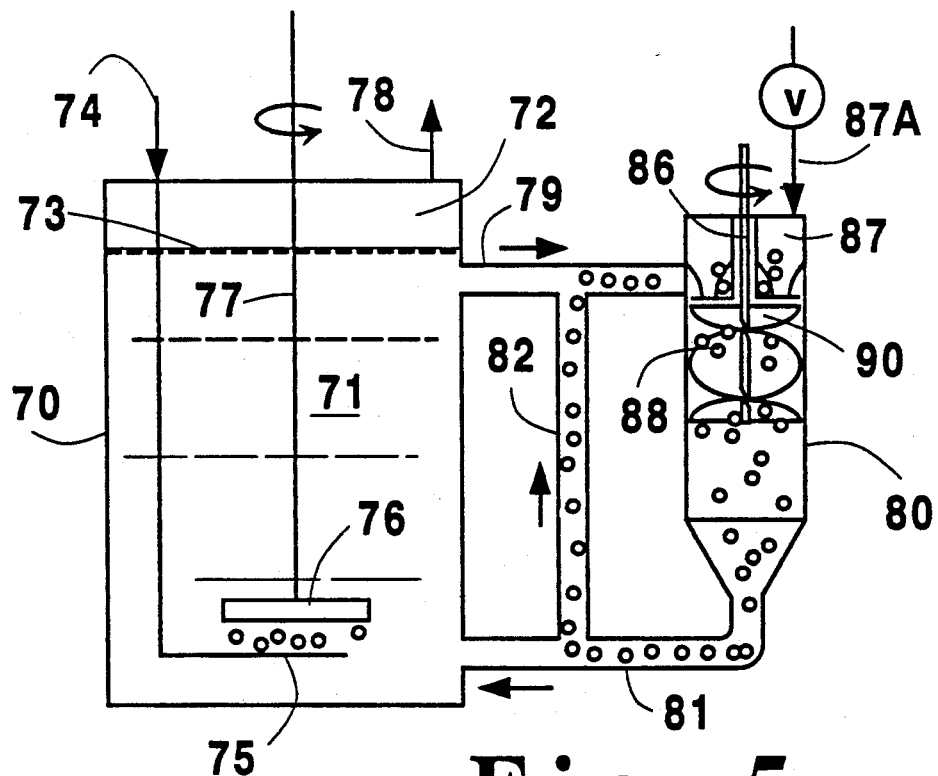
FIG. 5 is a side elevational view of another embodiment of the invention utilizing a side-stream mixer unit.

In an example of the benefits obtainable in the practice of the invention, processing vessel 70 with which AGR unit 90 was employed in the practice of the sidestream, in-line mixer embodiment of FIG. 5 was a small commercial fermenter unit in which yeast cells were being produced. When the fermenter was operated in the standard STR mode with air sparging, the dissolved oxygen concentration at the time of high growth rate of the yeast cells was about 1.5 milligrams of oxygen per liter of solution. When the FIG. 5 embodiment was employed, with the oxygen-rich stream removed from AGR unit 90 being recirculated into fermenter vessel 70, the dissolved oxygen level was increased to about 30 milligrams per liter of solution at an overall reduction in energy requirements of about 10%.

A practical operating advantage of the invention, as compared to a conventional SSP system, is that no rotating shaft seal in contact with liquid is required in the practice of the invention. The potential problem in maintaining sterility with typical pump seals, as may be used in SSP systems, has been of major concern in the adaptation of SSP oxygenation systems to certain types of pharmaceutical fermentations. Furthermore, the gas-liquid mixing system of the invention can operate at essentially atmospheric pressure conditions as compared to the elevated pressures required in SSP systems. In addition, the shear forces, which might damage the cells in a fermentation operation, are less with respect to the body of liquid in the principal reaction vessel when the invention is practiced, as with an in-line AGR unit, than when an SSP system is employed.

It will be understood that various changes and modifications can be made in the details of the invention without departing from the scope of the invention as recited in the subject claims. With respect to the Passing of a portion of the liquid in the body of liquid through an in-line gas dissolution device, it will be appreciated that the portion passed will vary depending on the particular gas-liquid mixing operation and the particular size and nature of the apparatus employed, as well as the additional quantity of oxygen, or other gas, which is desirably dissolved in the liquid. In general, however, the portion of liquid will be such that all of the body of liquid passes through the in-line gas dissolution device in a reasonable period of time, typically from about ½ hour to about an hour or more.

The invention provides, therefore, an improved gas-liquid mixing process and system, capable of more efficiently and more effectively dissolving gases in liquids. As such, it represents a highly desirable advance in the gas-liquid mixing art and enables gases to be dissolved in large volumes of liquids at higher gas utilization rates and lower energy requirements than conventional processes and systems in practical commercial applications.

We claim:

1. An improved gas-liquid mixing process comprising:
    (a) maintaining a body of liquid in a recirculating flow condition within a mixing vessel, said body of liquid having a gas-liquid interface with an overhead gas space within the mixing vessel;
    (b) introducing a primary feed gas stream directly into said body of liquid, the recirculation flow path and flow velocity of the body of liquid being such that bubbles of gas formed upon introduction of said feed gas stream into the liquid are circulated with said body of recirculating liquid for gas dissolution in, or reaction with, said body of liquid;
    (c) continuously passing a portion of the liquid in said body of liquid through a mechanical in-line gas dissolution device of high energy and gas use and/or reaction efficiency;
    (d) introducing a secondary feed gas to the portion of the liquid passing through said in-line gas dissolution device; and
    (e) continuously recirculating said portion of the liquid enriched with dissolved secondary gas from said in-line gas dissolver device back into said body of liquid in the mixing vessel, whereby high gas utilization efficiency is obtained and the energy required per unit of gas dissolved and/or reacted with the liquid is minimized.

2. The process of claim 1 in which said primary feed gas stream comprises air, and said secondary feed gas comprises oxygen.

3. The process of claim 1 in which said in-line gas dissolution device comprises a hollow draft tube with an axial flow, down-pumping impeller means positioned therein, and including rotating said impeller means to create a recirculating flow pattern within said in-line gas dissolution device, with liquid passing downward inside the draft tube and upward outside of said draft tube.

4. The process of claim 3 in which said in-line gas dissolution device includes an outer shell positioned within said body of liquid and having openings for the passage of said portion of the liquid to the interior thereof, and for the discharge of liquid enriched in dissolved secondary gas therefrom, such that the recirculating flow path within said outer shell draws liquid and accompanying gas bubbles into the upward passing liquid in said annular space, and liquid enriched in dissolved secondary gas is discharged from the bottom portion of said outer shell into said body of liquid in the mixing vessel.

5. The process of claim 4 and including introducing a secondary feed gas to the overhead space above the level of liquid in said outer shell, said recirculating flow pattern within the outer shell being such as to develop vortices and draw said secondary feed gas from the overhead gas space by gas ingestion into the liquid passing downward inside the draft tube.

6. The process of claim 5 in which said feed gas stream comprises air, and said secondary feed gas comprises oxygen.

7. The process of claim 3 in which said hollow draft tube comprises the outer shell of said gas dissolution device, said outer shell being positioned outside said mixing vessel, said recirculating flow pattern comprising the passing of liquid from the mixing vessel to the upper portion of said gas dissolution device, and the recirculation of liquid having a high dissolved concentration of said secondary feed gas from the bottom portion of said gas dissolution device back into said mixing vessel.

8. The process of claim 7 and including introducing a secondary feed gas into the overhead space above the level of liquid in said outer shell, said recirculating flow pattern being such as to develop a vortex and draw said secondary feed gas from the overhead gas space by gas ingestion into the liquid passing downward in said gas dissolution device.

9. The process of claim 8 in which said feed gas stream comprises air, and said secondary feed gas comprises oxygen.

10. An improved apparatus for mixing a gas and a liquid comprising:
 (a) a mixing vessel having agitation means adapted to maintain a body of liquid in a recirculating flow pattern therein, said body of liquid having a gas-liquid interface with an overhead gas space within the mixing vessel;
 (b) conduit means for introducing a feed gas stream directly into said body of liquid;
 (c) a mechanical in-line gas dissolution device adapted to continuously receive a portion of the liquid from said body of liquid and to efficiently dissolve and/or react a second gas introduced therein;
 (d) conduit means for introducing a second feed gas to the portion of the liquid passing through said in-line gas dissolution device; and
 (e) mechanical means for continuously passing said portion of the liquid enriched in dissolved secondary gas from said in-line gas dissolution device back into said body of liquid in the mixing vessel, whereby high gas utilization efficiency is obtained and the energy required per unit of gas dissolved and/or reacted with the liquid is minimized.

11. The apparatus of claim 10 in which said in-line gas dissolution device comprises a hollow draft tube with an axial flow, down-pumping impeller means positioned therein and capable of creating a recirculating flow pattern within said in-line gas dissolution device, with liquid passing downward inside the draft tube and upward outside of said draft tube.

12. The apparatus of claim 11 in which said in-line gas dissolution device includes an outer shell positioned within said body of liquid and having openings therein for the passage of said portion of the liquid to the interior thereof, and for the discharge of liquid enriched in dissolved secondary gas from the bottom portion thereof into the body of liquid in the mixing vessel.

13. The apparatus of claim 12 and including conduit means for introducing a secondary feed gas into the overhead space above the level of liquid in said outer shell, said axial flow, down-pumping impeller means being capable of creating said recirculating flow pattern within the outer shell such as to develop vortices and draw said secondary feed gas from the overhead gas space by gas ingestion into the liquid passing downward inside the draft tube.

14. The apparatus of claim 11 in which said hollow draft tube comprises the outer shell of said in-line gas dissolution device, said outer shell being positioned outside said mixing vessel.

15. The apparatus of claim 14 and including conduit means for introducing a secondary feed gas to the overhead space above the level of liquid in said outer shell, said axial flow, down-pumping impeller means being adapted to develop vortices and draw said secondary feed gas from the overhead gas space by gas ingestion into the liquid passing downward in said gas dissolution device.

16. The apparatus of claim 15 in which said axial flow, down-pumping impeller means comprises double helical impeller means.

17. The apparatus of claim 15 in which said axial flow, down-pumping impeller means comprises upper and lower axial flow impellers having a radial flow Rushton turbine means positioned therebetween.

* * * * *